(12) United States Patent
Fehrenbach

(10) Patent No.: US 8,869,966 B2
(45) Date of Patent: Oct. 28, 2014

(54) DEVICE FOR HANDLING VALUE DOCUMENTS

(75) Inventor: Christian Fehrenbach, Schonach (DE)

(73) Assignee: Wincor Nixdorf International GmbH (DE)

( * ) Notice: Subject to any disclaimer, the term of this patent is extended or adjusted under 35 U.S.C. 154(b) by 74 days.

(21) Appl. No.: 13/513,508

(22) PCT Filed: Dec. 3, 2010

(86) PCT No.: PCT/EP2010/068827
§ 371 (c)(1),
(2), (4) Date: Jul. 17, 2012

(87) PCT Pub. No.: WO2011/067374
PCT Pub. Date: Jun. 9, 2011

(65) Prior Publication Data
US 2012/0282073 A1 Nov. 8, 2012

(30) Foreign Application Priority Data

Dec. 4, 2009 (DE) .......................... 10 2009 057 068

(51) Int. Cl.
*G07F 7/04* (2006.01)
*G07D 11/00* (2006.01)
*G06F 1/18* (2006.01)

(52) U.S. Cl.
CPC ........ *G07D 11/0081* (2013.01); *G07D 11/0006* (2013.01)
USPC .......................... 194/350; 361/729; 312/223.6

(58) Field of Classification Search
CPC ............. A47F 1/04; A47F 1/12; G06C 20/00; G06F 1/1632; G06F 13/4063; G06F 13/4068; G06F 13/409; G06F 13/4095; G06F 2213/4004; H01R 9/091; H01R 11/03; H01R 13/514; H02B 1/00; H02B 1/01; H02B 1/012; H05K 5/00; H05K 5/0026; H05K 5/00256

USPC .......... 194/350; 710/300, 303, 104; 361/142, 361/600, 601, 602, 728, 729; 902/39; 209/534; 235/379; 312/223.6; 340/748, 340/760, 785, 790
See application file for complete search history.

(56) References Cited

U.S. PATENT DOCUMENTS 6,619,461 B2 * 9/2003 Saltsov et al. ................. 194/317
7,242,590 B1 7/2007 Yeap et al.
(Continued)

FOREIGN PATENT DOCUMENTS

DE 1827061 U 2/1961
DE 3541910 A1 6/1987
(Continued)

OTHER PUBLICATIONS

International Search Report (in English) and Written Opinion (in German) for PCT/EP2010/068827, mailed Apr. 7, 2011; ISA/EP.
(Continued)

*Primary Examiner* — Mark Beauchaine
(74) *Attorney, Agent, or Firm* — Harness, Dickey & Pierce, P.L.C.

(57) ABSTRACT

The invention relates to a device (10) for handling notes of value. The device comprises a first module (16a) that in an operating state is electrically conductive connected via a first electrical wire to a power supply unit (26) and electrically conductive connected via a second electrical wire to a second module (16b). In a maintenance state the first module (16a) is neither electrically conductive connected to the first electrical wire nor electrically conductive connected to the second electrical wire.

16 Claims, 11 Drawing Sheets

(56) References Cited

U.S. PATENT DOCUMENTS

| | | |
|---|---|---|
| 2002/0066636 A1 | 6/2002 | Saltsov et al. |
| 2003/0000957 A1 | 1/2003 | Brexel et al. |
| 2010/0126827 A1 | 5/2010 | Fehrenbach et al. |

FOREIGN PATENT DOCUMENTS

| | | |
|---|---|---|
| DE | 20100426 U1 | 5/2001 |
| EP | 0164733 A2 | 12/1985 |
| EP | 0419694 A1 | 4/1991 |
| EP | 0692599 A1 | 1/1996 |
| WO | WO-9731342 A1 | 8/1997 |
| WO | WO-01/54078 A2 | 7/2001 |
| WO | WO-2009013765 A1 | 1/2009 |

OTHER PUBLICATIONS

International Preliminary Report on Patentability for PCT/EP2010/068827 mailed Jul. 19, 2012 (8 pages).

Translation of International Preliminary Report on Patentability for PCT/EP2010/068827 mailed Oct. 4, 2012 (7 pages).

* cited by examiner

DEVICE FOR HANDLING VALUE DOCUMENTS

CROSS-REFERENCE TO RELATED APPLICATIONS

This application is a National Stage of International Application No. PCT/EP2010/068827, filed Dec. 3, 2010, and published in German as WO 2011/067374 A1 on Jun. 9, 2011. This application claims the benefit and priority of German Application No. 10 2009 057 068.3, filed Dec. 4, 2009. The entire disclosures of the above applications are incorporated herein by reference.

BACKGROUND

This section provides background information related to the present disclosure which is not necessarily prior art.

1. Technical Field

The invention relates to a device for handling notes of value comprising a central power supply unit that is electrically conductive connected to a first end of an electrical wire for transmitting electrical power with a first module, wherein the second end of the first electrical wire opposite to the first end is connected to a first plug connector. Furthermore, the device comprises at least a second module that is electrically conductive connected to a first end of a second electrical wire for transmitting electrical signals between the first and the second module, wherein the second end of the second electrical wire opposite to the first end is connected to a second plug connector. In an operating state the first module is electrically conductive connected to the first electrical wire and the second electrical wire, whereas in a maintenance state the module is neither electrically conductive connected to the first nor to the second electrical wire.

2. Discussion

In particular, the device is an automated teller machine, an automatic cash register system and/or an automatic cash safe for cash deposit and/or cash dispensing of notes of value. These devices each comprise several cash boxes, preferably four cash boxes in which the deposited notes of value are received and from which the notes of value to be dispensed are removed. Each respective cash box is assigned a separating and/or a stacking module that removes notes of value from the cash boxes and supplies them to the cash boxes. Via several electrical wires each separating module is connected to a central control unit, to a power supply unit, to the respective cash box and to adjacent separating and/or stacking modules, wherein via these electrical wires electrical signals, in particular control signals and/or data and electrical power for supplying electric loads existing in the separating and/or stacking module and/or the cash box are transmitted.

In known automated teller machines the individual electrical wires are each mounted via an own plug connector to a corresponding complementary plug connector of a controller card of the separating and/or stacking module. For maintenance of the automated teller machine, the automatic cash safe and/or the automatic cash register system the cash boxes and the separating and/or stacking modules connected to it must be removed from the device and the plug connectors of all electrical wires must be unplugged individually and plugged on later after maintenance on the controller card before operating the device again. This plugging on of the plug connectors to the controller card after maintenance is complex and time-consuming, as the separating modules, in particular the controller cards of the separating modules are difficult to access and the service technician in charge often has to plug on the plug connectors without visual contact by groping the plug connectors.

SUMMARY OF THE INVENTION

It is an object of the invention to specify a device for handling notes of value that can be maintained easily.

According to the invention the device comprises an adapter that includes a third plug connector formed complementary to the first plug connector, a fourth plug connector formed complementary to the second plug connector and at least a fifth plug connector, wherein the fifth plug connector is electrically conductive connected to the third plug connector and electrically conductive to the fourth plug connector. The module on the other hand comprises a sixth plug connector formed complementary to the fifth plug connector, wherein in the operating state the contact elements of the fifth plug connector are electrically conductive connected to the contact elements of the sixth plug connector, and wherein between the fifth and the sixth plug connector as well the power is transmittable via the first electrical wire as the electrical signals are transmittable via the second electrical wire. By this, it is achieved that for establishing the electrical connection between the first module and the power supply unit via the first electrical conductor and for establishing the electrical connection between the first module and the second module via the second electrical wire simply a plug connector has to be connected to the first module, in particular to the sixth plug connector of the first module. Thus, during maintenance the first module can be separated from both electrical wires easily and quickly, and after maintenance it can be reconnected easily to both electrical wires.

It is especially advantageous if the plug connection between the adapter and the first electrical wire via the first and the third plug connector as well as the plug connection between the adapter and the second electrical wire via the second plug connector and the fourth plug connector is maintained permanently, even in the maintenance state, by producing the plug connection between the first and the third plug connector as well as the plug connection between the second and the fourth plug connector just once during assembly of the device, otherwise the adapter is permanently connected to the first electrical wire and to the second electrical wire, irrespective of whether the device is in the maintenance state or in the operating state. Overall, via the adapter a simple and quick maintenance of the device is enabled, thus saving time and costs. In particular in the case of maintenance-intensive devices, especially in the case of automated teller machines, an automatic cash register system and/or automatic cash safes considerable costs can be saved.

The first module is particularly a separating and/or stacking module for supplying notes of value to a cash box and/or for removing notes of value from the cash box. In this case the device is in particular an automated teller machine, an automatic cash register system and/or an automatic cash safe. Such separating and stacking modules have to be maintained regularly in order to guarantee the regular operation and to prevent a jam of the notes of value. In contrast to known automated teller machines, automatic cash register systems and/or automatic cash safes in which each electrical wire that has to be connected must be mounted to the module separately after maintenance, by providing the adapter only one plug connector has to be connected to the separating and/or stacking module.

The second electrical wire is in particular a data wire for providing a BUS-connection between the first module and the second module. The second module is in particular also a separating and/or stacking module that, via the second electrical wire is connected to the first separating and/or stacking module. Via the data wire in particular control information for controlling the separating and/or stacking module is transmitted.

In a preferred embodiment of the invention the third, the fourth and the fifth plug connector are arranged on a circuit board, wherein the third plug connector is electrically conductive connected to the fifth plug connector as well as the fourth plug connector is electrically conductive connected to the fifth plug connector via the conductor path of the circuit board. Thus, a compact design of the adaptor and a secure and simple electrical connection of the fourth plug connector with the fifth plug connector and the third plug connector with the fifth plug connector are achieved. In an especially preferred embodiment of the invention the sixth plug connector is also arranged on a circuit board of the separating and stacking module. This circuit board is in particular a controller card of the separating and/or stacking module.

The length of the conductor path connecting the fourth plug connector to the fifth plug connector is formed as small as possible, so that there are only minor transmission losses and interferences when transmitting the electrical signals transmitted via the second electrical wire between the fourth plug connector and the fifth plug connector. The length of the conductor path connecting the fourth plug connector to the fifth plug connector has particularly a value in the range between 5 mm and 50 mm, preferably in the range between 8 mm and 20 mm.

The distance between the third plug connector and the fourth plug connector is however chosen as large as possible so that the electrical signals transmitted via the fourth plug connector and the electrical power transmitted via the third plug connector do not influence each other or do only influence each other slightly, thus guaranteeing a high transmission quality of the electrical signals. The distance has particularly a value in the range between 40 mm and 70 mm, preferably in the range between 45 mm and 60 mm. Through this on the one hand a compact design of the adapter is enabled and on the other hand a sufficiently large distance between the third plug connector and the fourth plug connector is guaranteed.

In a preferred embodiment of the invention the cash box that is assigned to the first module is connected to a first end of a third electrical wire for transmitting electrical power and/or control signals. The second end of the third electrical wire opposing the first end is connected to a seventh plug connector, wherein the adapter comprises an eighth plug connector electrically conductive connected to the fifth plug connector and formed complementary to the seventh plug connector. Via the connection present in the operating state between the fifth and sixth plug connector the electrical power transmittable via the third electrical wire and/or the transmittable control signals are transmittable. With this embodiment it is achieved that the first module is not only connected via the adapter to a first and a second electrical wire but additionally connected to a third electrical wire and thus to the cash box.

In a further preferred embodiment of the invention the device comprises a third module, in particular a separating and/or stacking module that is electrically conductive connected to a first end of a fourth electrical wire for transmitting electrical signals between the first and the third module. A second end of the fourth electrical wire opposite to the first end is connected to a ninth plug connector, wherein the adapter comprises a tenth plug connector electrically conductive connected to the fifth plug connector and formed complementary to the ninth plug connector, and via the plug connection formed in the operating state between the fifth and sixth plug connector the electrical signals transmittable via the fourth electrical wire can be transmitted. In this embodiment of the invention the first module thus is connectable to another module via the adapter, so that via the adapter all in all the electrical power, the electrical signals, the data and the control signals of four electrical wires are transmittable.

In an especially preferred embodiment of the invention all electrical signals and the power required for operating that are transmitted to the first module or, respectively, are given out by the first module, are transmitted via the plug connection formed between the fifth and sixth plug connector and thus via the adapter. Through this, it is achieved that after maintenance only one plug connection by mounting the fifth plug connector of the adapter to the sixth plug connector of the first module must be plugged on, guaranteeing a quick and simple recommissioning of the device.

In a further preferred embodiment of the invention the device comprises four cash boxes, each of which is assigned a separating and/or stacking module. Each of these separating and/or stacking modules is connected to the device and/or connected to each other via an above-mentioned adapter, wherein all electrical signals to be transmitted between the device and the respective separating and/or stacking module and the electrical power necessary for operation are transmitted via this adapter.

Furthermore, it is advantageous if the first module comprises a first cover element and the adapter comprises a second cover element, and if in the operating state the first cover element and the second cover element are connected to each other and if in the maintenance state both cover elements are separated from each other. With the cover elements it is achieved that the circuit board of the first module as well as the circuit board of the adapter are protected. Moreover, through this it is achieved that the adapter can be handled more easily. For this purpose the second cover plate is formed such that it can be handled easily, in particular it is provided with a handle and/or a recessed grip.

It is advantageous if the first cover element comprises an elastic first connecting element and the second cover element comprises a second connecting element formed complementary to the first connecting element. In the operating state the first and the second cover element are connected to each other via a clip-connection formed between the first and the second connecting element. In this way, it is achieved that both cover elements and consequently the adapter and the first module can be connected to each other easily, so that after maintenance the adapter can be replugged easily to the first module. The clip-connection is particularly formed such that the clip-connection can be released non-destructively by an appropriate elastic deformation of the elastic first connecting elements, so that the clip-connection can be released for maintenance and can be restored after maintenance without having to replace parts. In an alternative embodiment of the invention the second connecting part also can be additionally or alternatively of an elastic structure.

The clip-connection is in particular formed such that the second connecting element comprises a groove and the first connecting element has an engagement element formed complementary to the groove, wherein the engagement element engages in the in the groove in the connected condition, that is in the condition in which the clip-connection is formed. By elastic deformation of the first connecting element the engagement element is removed from the groove, so that the clip-connection between the first and the second cover element can be released.

In an alternative embodiment of the invention the first and the second cover element are connectable alternatively or additionally via a plug and/or snap connection.

The first connecting element is particularly formed as a nose protruding laterally from the first cover element, wherein the nose preferably is tapered in the direction opposite to the first cover element. By this it is achieved that, when mounting the adapter to the first module via the first and the second connecting element the adapter is guided relatively to the first module, so that the plug connection between the fifth and the sixth plug connector can be established easily. Due to the tapered form of the first connecting element here it is in particular achieved that when mounting the adapter it is only movable such that when the clip-connection is established, there is automatically a plug connection between the fifth and the sixth plug connector. Thus, it is achieved that after maintenance the adapter can be replugged easily and accurately, without the service operator carrying out the maintenance having to see the space at which the adapter is mounted. Thus, it is achieved that the first module can be connected easily via the adapter to all electrical wires required for a regular operation of the module, even at places that are difficult to access and not visible.

Moreover, it is advantageous if the first cover element comprises a first guiding element and the adapter has a second guiding element formed complementary to the first guiding element. When connecting the first cover element and the second cover element the first and the second guiding element are at least temporarily engaged, so that the first and the second cover element are engaged with each other at least temporarily, so that the first and the second cover element are guided relatively to each other via contact between the first and the second guiding element. In this way in addition to the guiding achieved by mounting the adapter via the first and the second connecting element an additional guiding of the adapter relatively to the first module is achieved. By the first and the second connecting element in particular a coarse guidance is achieved, through which the adapter is firstly guided when mounting the adapter, whereas through the first and the second guiding element a fine guidance is achieved, through which the adapter is firstly guided at the end of the mounting, thus shortly before and during establishing the plug connection between the fifth and the sixth plug connector. Hereby, it is guaranteed that the plug connection between the fifth and the sixth plug connector is established reliably and easily even if there is no visual contact when mounting the adapter and/or even there is only a limited mounting space.

Additionally or alternatively to the first and the second guiding element the second cover element can comprise a third guiding element and the first module a fourth guiding element formed complementary to the third guiding element, wherein when connecting the first and the second cover element the third and the fourth guiding element engage at least temporarily, and the first cover element and the second cover element are guided relatively to each other via contact between the third and the fourth guiding element. By providing four guiding elements a double fine guidance of the adapter is achieved relatively to the first module when replugging the adapter. In this case the guiding elements are especially arranged such that the first fine guidance effected by the first and second guiding element and the second fine guidance effected by the third and fourth guiding element are arranged on opposite sides of the plug connection established between the fifth and sixth plug connector. Through this, when mounting the adapter to the first module a secure guidance as even as possible is achieved.

The first and/or the third guiding element in particular each comprise a groove, whereas the second guiding element is formed as a slot in a circuit board of the adapter, in which the first guiding element engages when connecting the first cover element and the second cover element so that the groove of the first guiding element is guided in this slot. In the same way the fourth guiding element is in particular formed as a slot in a circuit board of the module, in which the third guiding element engages when connecting the first cover element and the second cover element, so that the groove of the third guiding element is guided in this slot. In this way an easy and secure guidance of the adapter relatively to the module is guaranteed.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed Figures explains the invention in more detail with reference to embodiments.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
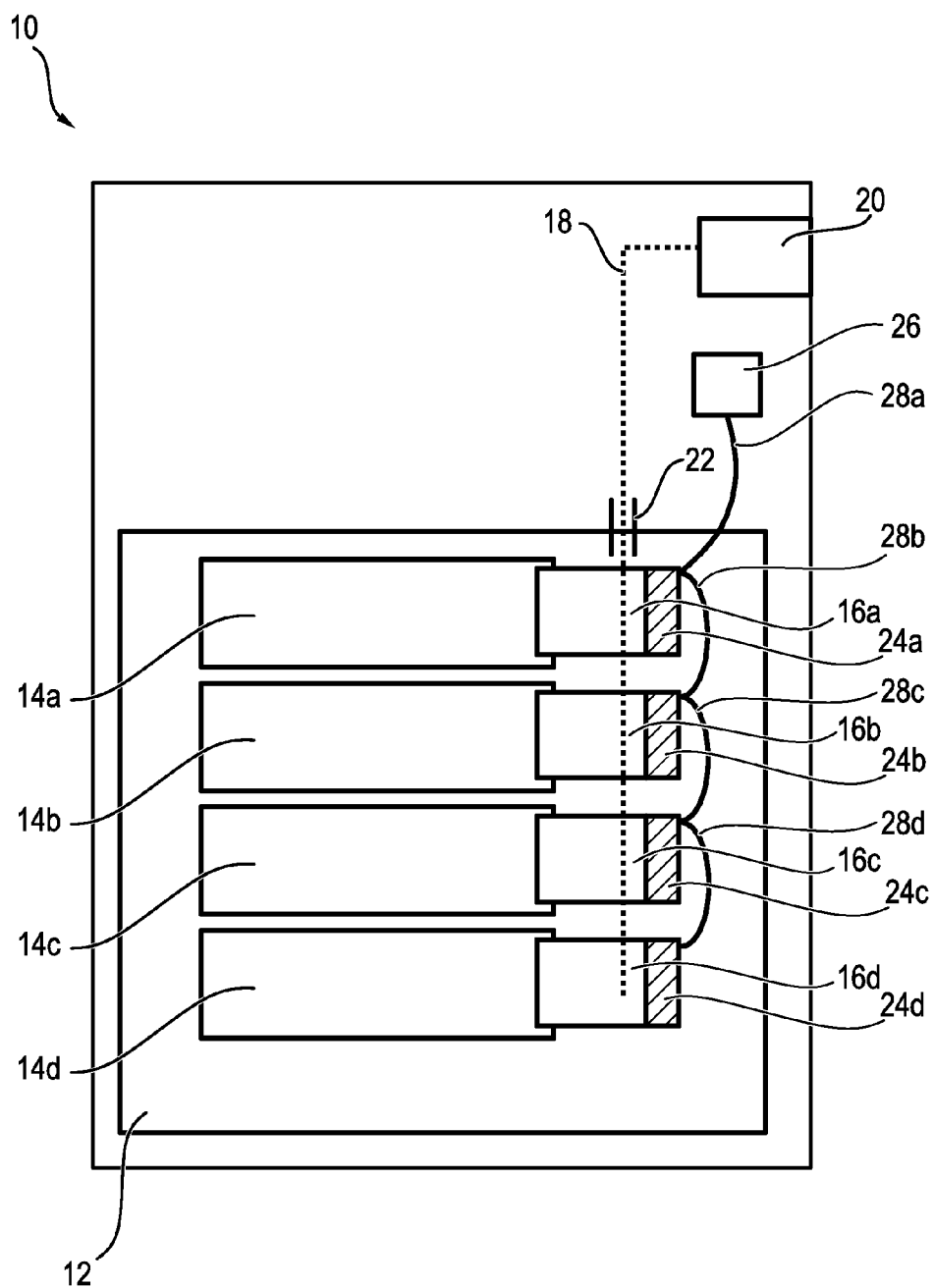
FIG. 1 is a schematic perspective illustration of an automated teller machine in an operating state.

FIG. 1 shows a schematic illustration of an automated teller machine 10 in an operating state. Alternatively, the device can also be an automatic cash register system or an automatic cash safe. The operating state is the state in which notes of value can be deposited in the automated teller machine 10 and/or be dispensed by the automated teller machine 10.

The automated teller machine 10 comprises a safe 12, in which four cash boxes 14a to 14d are accommodated. Alternatively, in the safe 12 more or less than four cash boxes 14a to 14d can be accommodated. Each of these cash boxes 14a to 14d is assigned a separating and/or stacking module 16a to 16d by means of which notes of value can be removed from the respective cash box 14a to 14d and can be supplied to the respective cash box 14a to 14d. In an alternative embodiment of the invention the automated teller machine 10 can be, different from the previous description, not a deposit and dispensing automated teller machine but a mere cash deposit machine or a mere cash dispensing machine. In this case the notes of value are only supplied to the cash boxes 14a to 14d or respectively, dispensed by the cash boxes 14a to 14d.

The notes of value removed from the cash boxes 14a to 14d by means of the separating and/or stacking modules 16a to 16d are transported via a transport path 18 through a transfer slot 22 from the safe 12 and to an input and output compartment 20 where they are handed over to the operator of the automated teller machine 10. The notes of value deposited via the input and output compartment 20 are inversely supplied to the cash boxes 14a to 14d via the transport path 18 by the transfer slot 22 by means of the separating and/or stacking modules 16a to 16d. Here, the notes of value can be stored within the cash box 14a to 14d by single denomination or mixed denomination.

Each separating and/or stacking module 16a to 16d has at least one controller card comprising at least one circuit board that is not visible in FIG. 1 as each controller card is covered by a cover plate 24a to 24d. The design of the controller cards is described in more detail later on. The cover elements 24a to 24d of the separating and/or stacking modules 16a to 16d serve for protecting the controller cards as well as the further components of the separating and/or stacking module 16a to 16d. For this, the cover elements 24a to 24d are connected to the respective controller card and/or the housing of the respective separating and/or stacking module 16a to 16d, in particular via screws. Moreover, the automated teller machine 10 comprises a central control unit 26, by means of which the separating and/or stacking modules 16a to 16d and the cash boxes 14a to 14d are controlled and supplied with electric power. Alternatively, the control and power supply, i.e. the supply of electric power can take place by two separate units.

The separating and/or stacking modules 16a to 16d are electrically conductive connected to the control unit 26 and to each other via several electrical wires. Furthermore, the separating and/or stacking modules 16a to 16d are electrically conductive connected to the cash boxes 14a to 14d. The connection of the separating and/or stacking modules 16a to 16d to each other and to the central control unit 26 is indicated in FIG. 1 by means of the electrical wires 28a to 28d. Here, only one electrical wire is indicated, however each separating and/or stacking module 16a to 16d is connected to the other components via several electrical wires. The electrical wires 28a to 28d can especially be cables with several internal conductors and/or individual conductors, so-called single-conductors.

Figure 2:
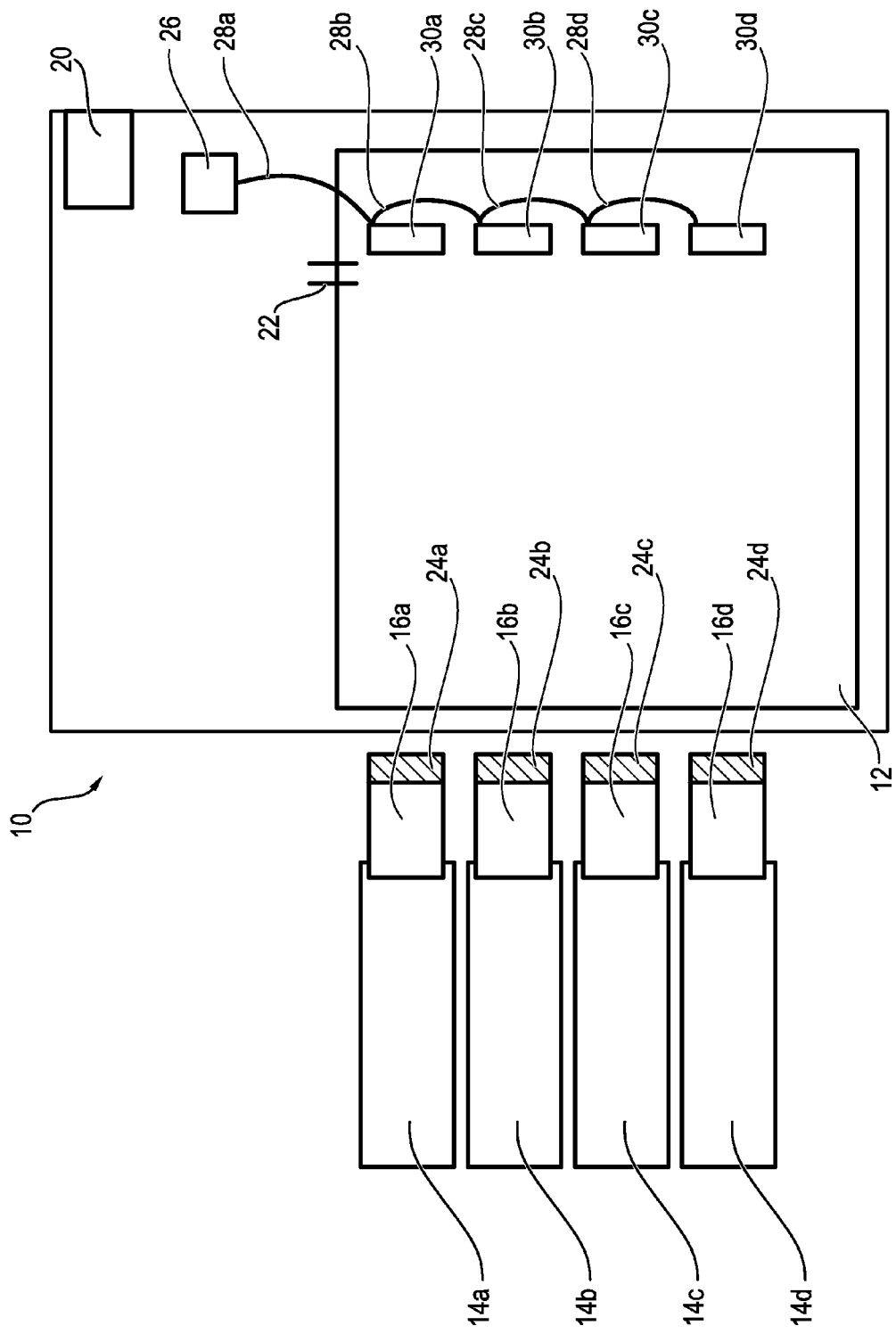
FIG. 2 is a schematic perspective illustration of the automated teller machine according to FIG. 1 in a maintenance state.

For maintenance of the automated teller machine 10 the cash boxes 14a to 14d and the separating and/or stacking modules 16a to 16d must be removed from the safe 12 and the automated teller machine 10. For this, the separating and/or stacking modules 16a to 16d have to be disconnected from the electrical wires 28a to 28d. FIG. 2 shows a schematic illustration of such a maintenance state of the automated teller machine 10. Elements with a same design and or same function have the same reference signs.

In order to be able to remove the separating and/or stacking modules 16a to 16d easily from the automated teller machine 10, the electrical wires 28a to 28d are connected to plug connectors so that the required connections between the respective separating and/or stacking module 16a to 16d and of the respective electrical wire 28a to 28d can be established and separated again easily. As has already been mentioned, each separating and/or stacking module 16a to 16d is connected to several electrical wires 28a to 28d. Here, not each electrical wire 28a to 28d is connected via an own plug connection to the controller card of the respective separating and/or stacking module 16a to 16d, but all electrical wires that are to be connected to a separating and/or stacking module 16a to 16d are each electrically conductive connected to an adapter 30a to 30d via a plug connection, wherein the respective adapter 30a to 30d is connectable to the controller card of the respective separating and/or stacking module 16a to 16d via a single plug connection.

Thus, it is achieved that when changing from the operating state to the maintenance state only one single plug connection has to be disconnected and when changing from the maintenance in the operating state, thus after completion of the maintenance work, only one plug connection between the controller card and the respective adapter 30a to 30d has to be established. For the person carrying out the maintenance it is much easier if just one plug connection has to be established and not each electrical wire 28a to 28d that has to be connected to the respective separating and/or stacking module 16a to 16d has to be mounted to the controller card by an individual plug connection.

The exact structure of the adapters 30a to 30d as well as the connection between the adapters 30a to 30d and the separating modules 16a to 16d is further explained in context with the following Figures. The adapter 30a to 30d remains in the maintenance state at the electrical wires 28a to 28d. The electrical wires 28a to 28d are in particular parts of a cable harness of the automated teller machine 10.

Figure 3:
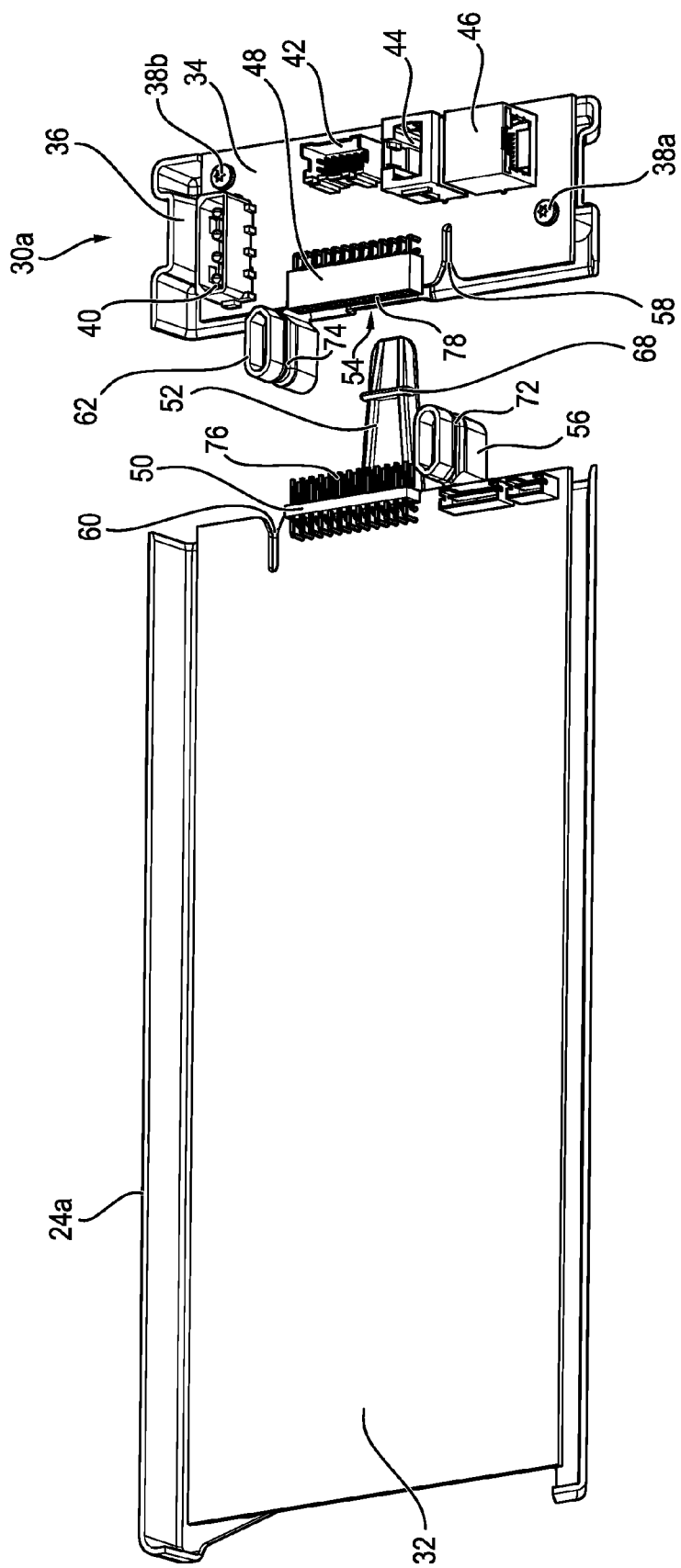
FIG. 3 is a schematic perspective illustration of a controller card and a cover element of a separating and/or stacking module and of an adapter in an unconnected state with a view to the inside facing the separating and/or stacking module.

FIG. 3 is a schematic perspective illustration of the cover element 24a of the first separating/and or stacking module 16a as well as of the controller card 32 of the first separating and/or stacking module 16a and of the first adapter 30a. The cover elements 24a to 24d of the other separating and/or stacking modules 16b to 16d, the controller cards of the other separating and/or stacking modules 16b to 16d as well as the other adapters 30b to 30d are designed correspondingly as is shown for the components of the separating and/or stacking module 16a in FIG. 3. Thus, the description of the design of the cover elements 24a to 24d of the separating and/or stacking modules 16a to 16d, of the controller cards 32 of the separating and/or stacking modules 16a to 16d as well as of the plug adapters 30a to 30d is carried out exemplarily by means of the design of the cover element 24a and the controller card 32a of the first separating and/or stacking module 16a as well as the first plug connector 30a. The explanations are correspondingly valid for the respective components of the other separating and/or stacking modules 16b to 16d and the other adapters 32b to 32d. For simplifying the description in the following the first cover element 24a of the first separating and/or stacking module 16a will be characterized as cover element 24a of the separating and/or stacking module 16a, the first controller card 32 of the first separating and/or stacking module 16a will be characterized as controller card 32 of the separating and/or stacking module 16a and the first adapter 30a will be characterized as adapter 30a.

In an alternative embodiment of the invention the controller cards 32 of the different separating and/or stacking modules 16a to 16d can be designed differently. In the same way the different plug adapters 32a to 32d can be designed differently. In particular the individual plug adapters 30a to 30d can be adapted to the individual situations of the individual separating and/or stacking modules 16a to 16d. However, it is advantageous if the plug adapters 30a to 30d are constructed identically, as in this case only one type of components has to be manufactured leading to a reduction of the manufacturing costs and to a minimizing of the component diversity so that less parts must remain available as spare parts.

FIG. 3 shows a view to the inside of the components 24a, 32, 30a, wherein the inside is the side facing the separating and/or stacking module 16a in a mounted state, whereas the outside is the side facing the safe wall.

Adapter 30a comprises a circuit board 34 as well as a cover element 36 that is connected to the circuit board 34 via two screws 38a, 38b. On the circuit board 24 five plug connectors 40 to 48 are arranged, wherein the four plug connectors 40 to 46 are electrically conductive connected to the fifth plug connector 48 via circuit paths of the circuit board 34. The first plug connector 40 serves for connecting the adapter 30a to a power supply unit and is therefore provided to supply the first separating and/or stacking module 16a with electric power. For this purpose a not shown sixth plug connector formed complementary to the first plug connector 40 that is arranged at one end of the electrical wire connected to the power supply unit is plugged in the first plug connector 40 for establishing a plug connection, so that the plug connectors are electrically conductive connected to each other.

Via the second plug connector 42 a plug connection with an electrical wire that is connected to a cash box 14a assigned to the first separating and/or stacking module 16a can be established. Via this plug connection electrical signals in particular data, as well as electric power for supplying electrical devices in the cash box 14a can be transmitted between the cash box 14a and the adapter 30a. The third and fourth plug connector 44, 46 each serve for establishing a BUS-connection between the controller card 32 and the adapter 30a and thus the first separating and/or stacking module 16a and a further module 16b to 16d, 26. The adapter 30a is particularly electrically conductive connected to the central control unit 26 via the third plug connector 44, and via the fourth plug connector 46 connected to the second separating and/or stacking module 16b, wherein in each case electrical signals are transmitted via the plug connections formed through the plug connectors 44, 46, preferably with coded data, in particular control data.

As mentioned above the first four plug connectors 40 to 46 are connected to the fifth plug connector 48 via the circuit paths of the circuit board 34. The controller card 32 comprises a seventh plug connector 50 formed complementary to the fifth plug connector. In a connected state shown in FIGS. 5 and 6 the fifth plug connector 48 and the seventh plug connector 50 are plugged one to the other so that they form a plug connection, and the contact elements of the plug connectors 48, 50 are electrically conductive connected to each other. In this connected state all electrical signals and electrical supply voltages transmitted via the plug connectors 40 to 46 can be transmitted via the plug connection formed between the fifth plug connector 48 and the seventh plug connector 50 between the adapter 30a and the controller card 32 and thus between the separating and/or stacking module 16a. Consequently, after maintenance of the automated teller machine 10 only one single plug connection, namely the plug connection between the fifth plug connector 48 and the seventh plug connector 50 has to be reconnected, and not four plug connections between the controller card 32 and the plug connectors plugged in the first four plug connectors 40 to 46 of the adapter 30a have to be restored. By this, the recommissioning of the automated teller machine 10 is made easier and costs and time are saved. Vice versa, for maintenance only one plug connection has to be released.

The plug connectors 40 to 48 are arranged on the circuit board such that the plug connectors 44, 46 serving for data transmission via BUS-connection are arranged at the fifth plug connector 48 as close as possible, so that the circuit paths connecting the fifth plug connector 48 to the third and fourth plug connector 44, 46 are as short as possible resulting in an only small impact on quality during data transmission. Vice versa, the plug connectors 40, 44, 46 are arranged such that the distance between the plug connectors 44, 46 serving for data transmission and the plug connector 40 serving for voltage supply is as large as possible, so that no interferences occur and the data transmission is not impaired by the transmitting electrical power. Alternatively or additionally a shielding for the circuit path can be provided.

In an alternative embodiment of the invention the adapter 30a can comprise more or less than five plug connectors 40 to 48. In the same way the plug connectors 40 to 46 can be connected to components different from the above-mentioned components. For example, in case of the second adapter 30b the corresponding third plug connector is not directly connected to the voltage regulating unit 26 but to the first plug connector 30a.

Furthermore, the cover element 24a comprises a first connecting element 52 and the cover element 36 a second connecting element 54 formed complementary to the first connecting element 52. Moreover, the cover element 24a has a first guiding element 56, the circuit board 34 a second guiding element 58, the controller card 32 a third guiding element 60 and the cover element 36 a fourth guiding element 62. The connecting elements 52, 54 and the guiding elements 56 to 62 serve on the one hand for connecting the adapter 30a to the cover element 24a and the controller card 32 and thus of the separating and/or stacking module 16a. Moreover, the connecting elements 52, 54 as well as the guiding elements 56 to 62 serve for guiding the adapter 30a relatively to the separating and/or stacking module 16a when mounting the adapter 30a to the separating and/or stacking module 16b.

Figure 4:
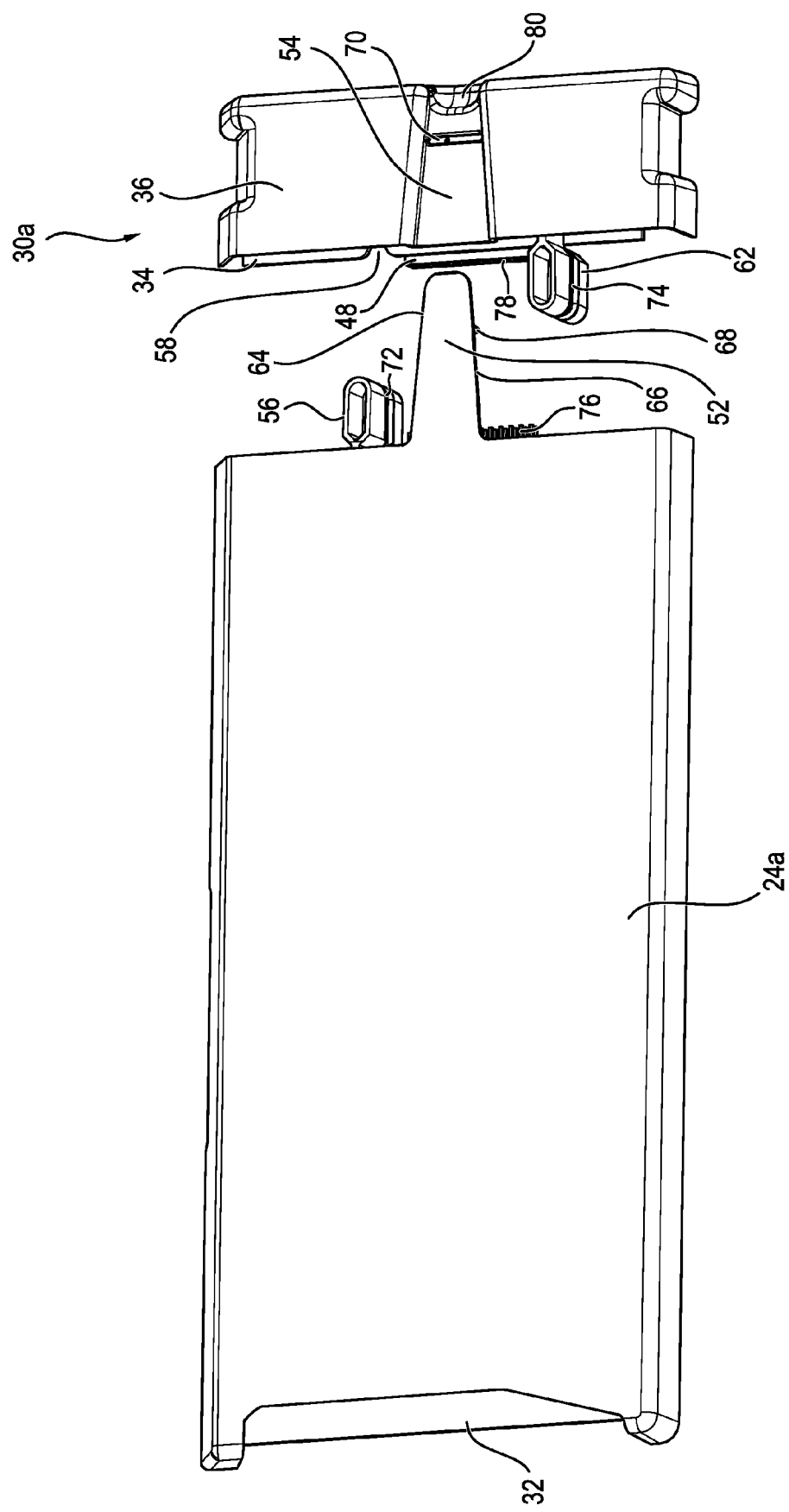
FIG. 4 is a schematic perspective illustration of the controller card of the separating and/or stacking module, the cover element of the separating and/or stacking module as well as the adapter according to FIG. 3 in an unconnected state with a view to the outside opposite to the inside.

FIG. 4 shows a schematic perspective illustration of the cover plate 24a and the controller card 32 of the first separating and/or stacking module 16a as well as the adapter 30a with view to the backside. FIG. 4 clearly shows the embodiment of the second connecting element 54. The first guiding element 52 is formed as a nose protruding laterally from the direction of the adapter 30a of the cover element 24a, wherein the first cover element 52 is tapered in the direction opposite of the cover element 24a. The two lateral legs 64, 66 of the first guiding element 52 in particular enclose an angle in the range between 5° and 15°, preferably an angle of 10°.

The first connecting element 52 has a projection 68 on the side facing the separation and/or stacking module 16a, whereas the second connecting element 54 has a groove 70 formed complementary to the projection 68. The first connecting element 52 is elastically deformable, so that when mounting the adapter 30a to the separating and/or stacking module 16a the first connecting element 52 can be deformed elastically, so that the projection 68 engages in the groove 70 of the second connecting element 54 for connecting the adapter 30a to the cover element 24a. For releasing the snap connection between the first connecting element 52 and the second connecting element 54 the first connecting element 52 is bent away manually from the adapter 30a and thus is deformed elastically until the projection 68 does not longer engage with the groove 70 and the adapter 30a can thus be removed from the separating and/or stacking module 16a.

In the connected state, i.e. when the first connecting element 52 and the second connecting element 54 are connected to each other, the fifth plug connector 48 and the seventh plug connector 50 are electrically conductive connected to each other so that the plug connection between the fifth and seventh plug connector 48, 50 is established.

The first connecting element 52 and the second connecting element 54 do not only serve for connecting the adapter 30a and the separating and/or stacking module 16a in the connected state, but serve as well for guiding the adapter 30a relatively to the separating module 16a when mounting the adapter 30a. Due to the tapered form of the first guiding element 52 and the corresponding tapered form of the complementary formed second guiding element 54 it is achieved that the adapter 30a can be mounted without visual contact and is guided such that in the connected state the plug connection between the fifth plug connector 48 and the seventh plug connector 50 remains. By this it is achieved that the adapter can be mounted easily even if there is only a limited space and/or if there is no visual contact. Thus, the assembly is made easier and time is saved.

The guiding of the adapter 30a relative to the separating and/or stacking module 16a through the first and the second connecting element 52, 54 is also designated as coarse guiding, as this does already effect a guiding even if the distance between the adapter 30a and the separating and/or stacking module 16a is still relatively large, whereas in addition to the coarse guiding by means of the four guiding elements 56 to 62 a fine guiding is caused, wherein this fine guiding of the adapter 30a relative to the separating and/or stacking module 16a is only caused when the adapter 30a is already positioned relatively close to the position at which it is arranged in the connected state.

For this, the second guiding element 58 and the third guiding element 60 are each formed as a slot in the circuit board 34 or the controller card 32, respectively. The first guiding element 56 and the fourth guiding element 62 show a circumferential recess 72, 74, wherein in the connected state the guiding elements 56, 62 engage with the slots 50, 60 at the places, in which the grooves 72, 74 are formed, so that the adapter 30a is fixed relatively to the separating and/or stacking module 16a. When mounted the adapter 30a is guided by means of the guiding elements 56 to 62 such that the pins 76 of the seventh plug connector 70 are guided parallel to the receiving areas 78 of the fifth plug connector 74 when connecting the adapter 30a to the separating and/or stacking module 16a, so that the plug connection between the fifth plug 48 and the seventh plug 50 can be established easily. All in all, by means of the coarse guiding through the first and the second connecting element 52, 54 as well as by means of the fine guiding through the guiding elements 56 to 62 a self-finding plug connection is formed.

In an alternative embodiment of the invention the adapter 30a can be connected to the separating and/or stacking module 16a via the connecting elements 52, 54 only and be guided only when mounting the adapter 30a to the separating and/or stacking module 16a. In a further alternative embodiment of the invention the adapter 30a can be guided via the guiding elements 56 to 62 only during assembly and in a connected state can be connected to the separating and/or stacking module 16a. Furthermore, alternatively instead of an snap connection between the first connecting element 52 and the second connecting element 54 a clip and/or plug connection can be used for mounting the adapter 30a to the separating module 16a. In the same way, more or less than four guiding elements 56 to 62 can be provided.

Figure 5:
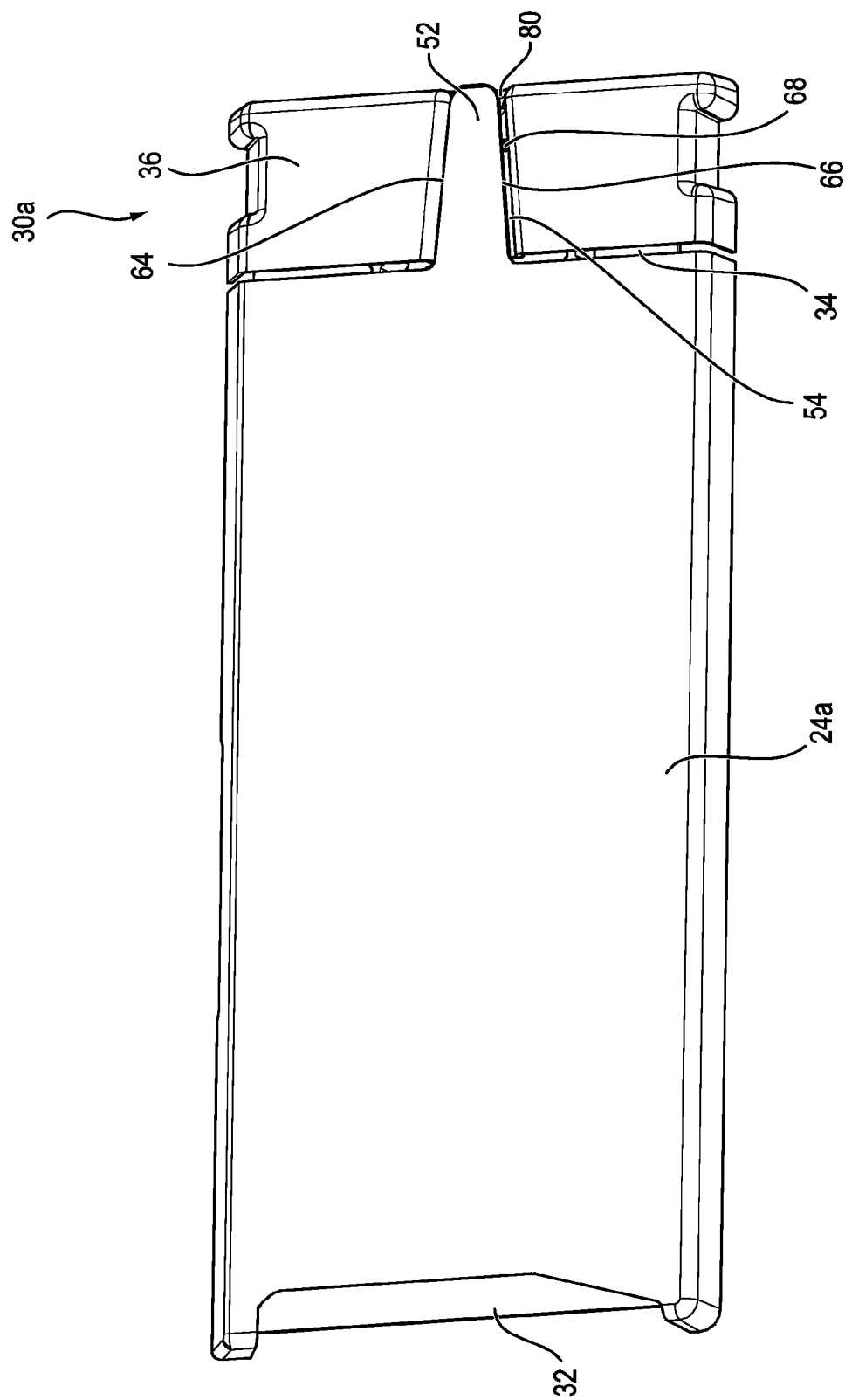
FIG. 5 is a schematic perspective illustration of the controller card of the separating and/or stacking module, the cover element of the separating and/or stacking module and the adapter according to FIGS. 3 and 4 in a connected state with a view to the outside.

FIG. 5 shows a schematic perspective illustration of the cover plate 24a, the controller card 32 and the adapter 30 in the connected state with view to the outside. In the connected state the snap connection is formed between the first connecting element 52 and the second connecting element 54. As can be seen from FIG. 4 the second connecting element 54 comprises a recess 80 that serves for an easier handling of the first connecting element 52 and can be deformed elastically in such a way in the connected state that the snap connection between the first connecting element 52 and the second connecting element 54 can be released easily. This results in an easier handling. The first connecting element 52 is in particular formed such that it is approximately as long as the width of the adapter 30a. In this way, an easy handling and a secure guiding are achieved.

Figure 6:
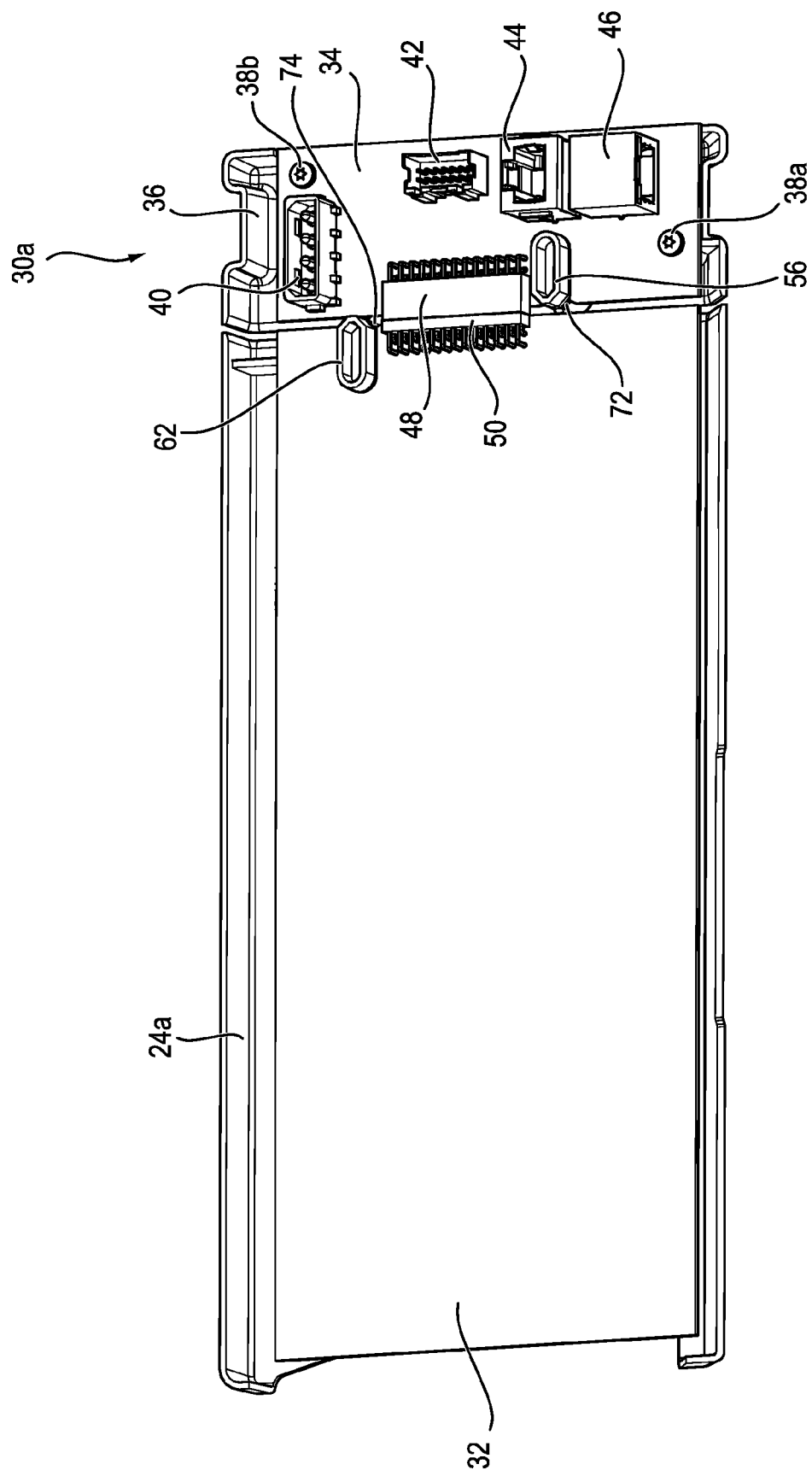
FIG. 6 is a schematic perspective illustration of the controller card of the separating and/or stacking module, the cover element of the separating and/or stacking module and the adapter in a connected state with a view to the inside.

FIG. 6 is a schematic perspective illustration of the cover element 24a, the controller card 32 and the adapter 30a in the connected state with view to the inside. In this connected state the first guiding element 56 and the second guiding element 58 as well as the third guiding element 60 and the fourth guiding element 62 engage with each other.

Figure 7:
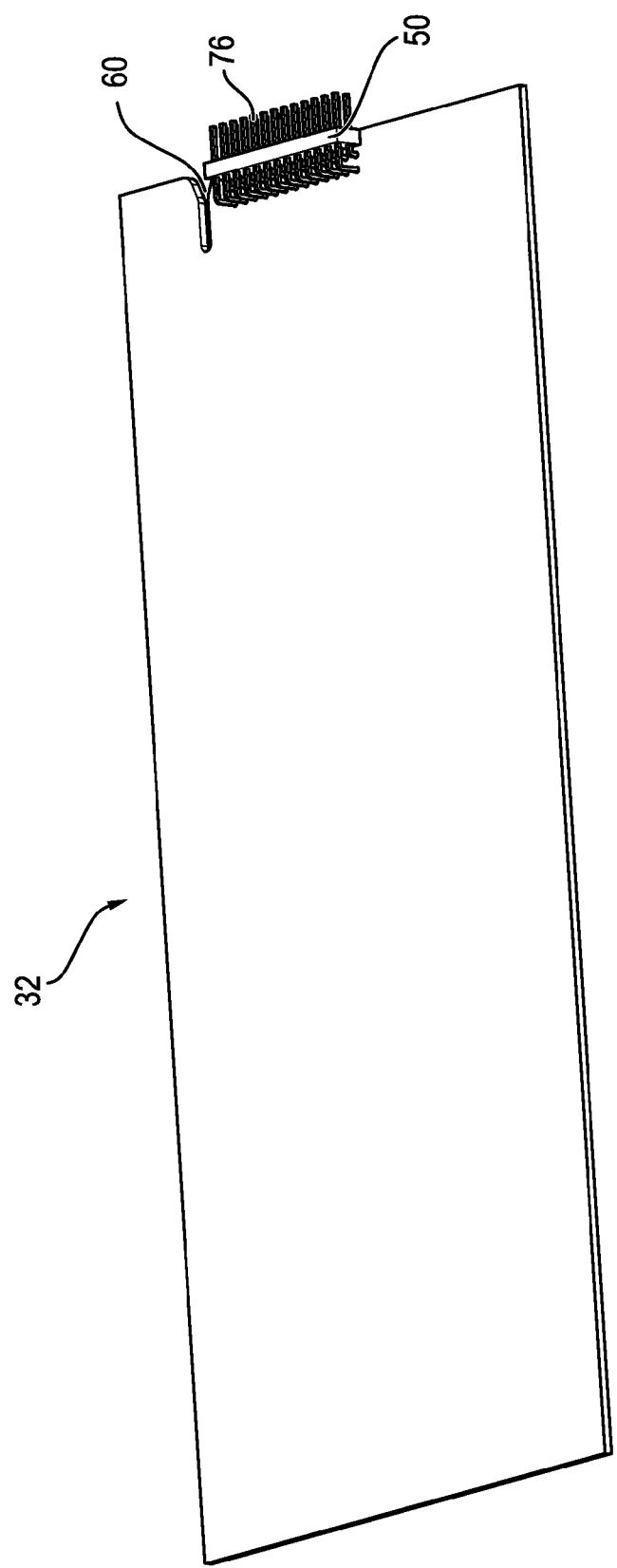
FIG. 7 is a schematic perspective illustration of the controller card.
Figure 8:
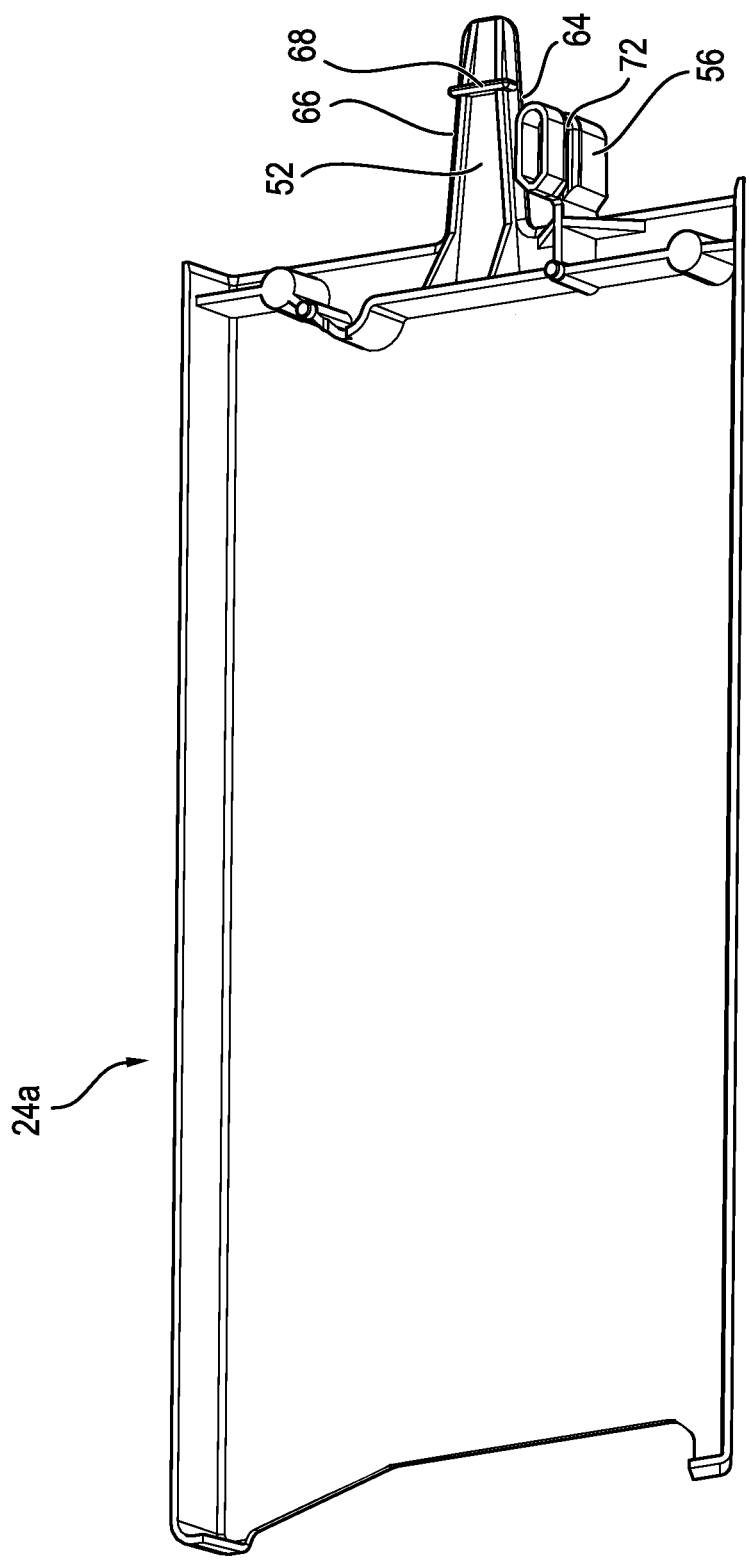
FIG. 8 is a schematic perspective illustration of the cover element of the separating and/or stacking module.
Figure 9:
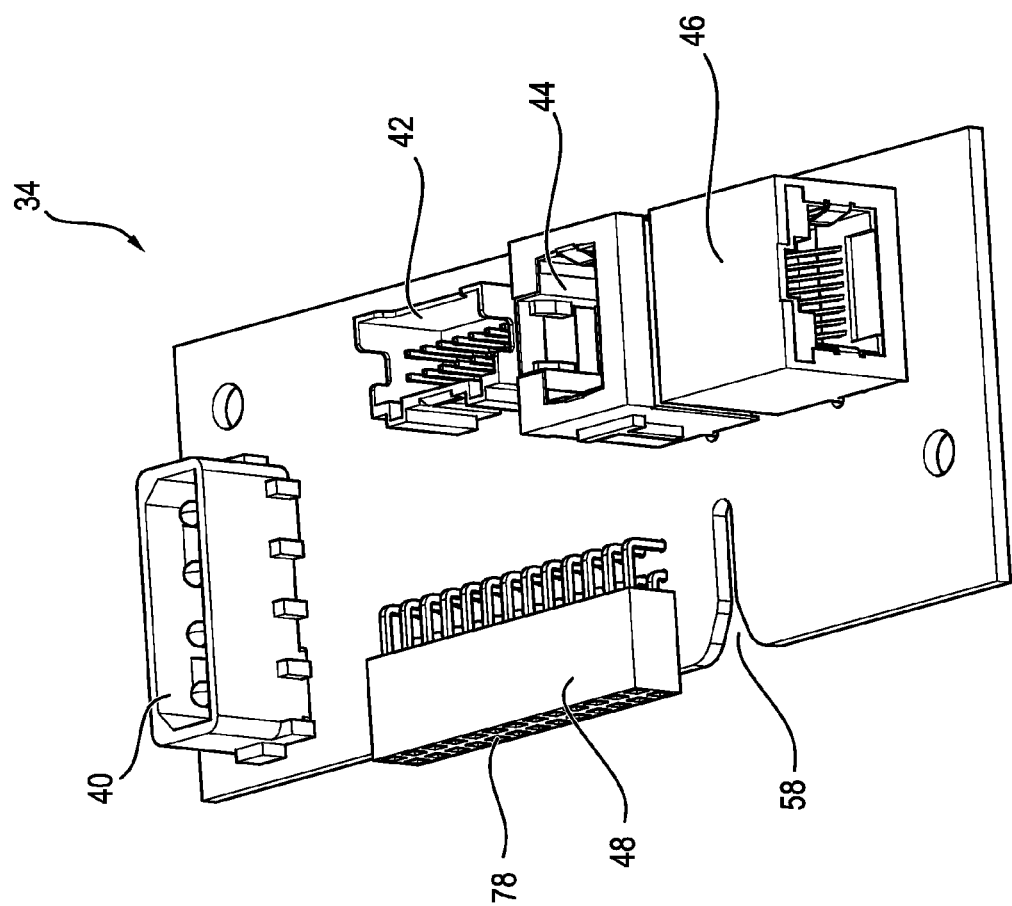
FIG. 9 is a schematic perspective illustration of a circuit board of the adapter.

FIG. 7 is a schematic perspective illustration of the controller card 32. FIG. 8 shows a schematic perspective illustration of the cover plate 24a. In FIG. 9 a schematic perspective illustration of the circuit board 34 of the adapter 30a is shown.

Figure 10:
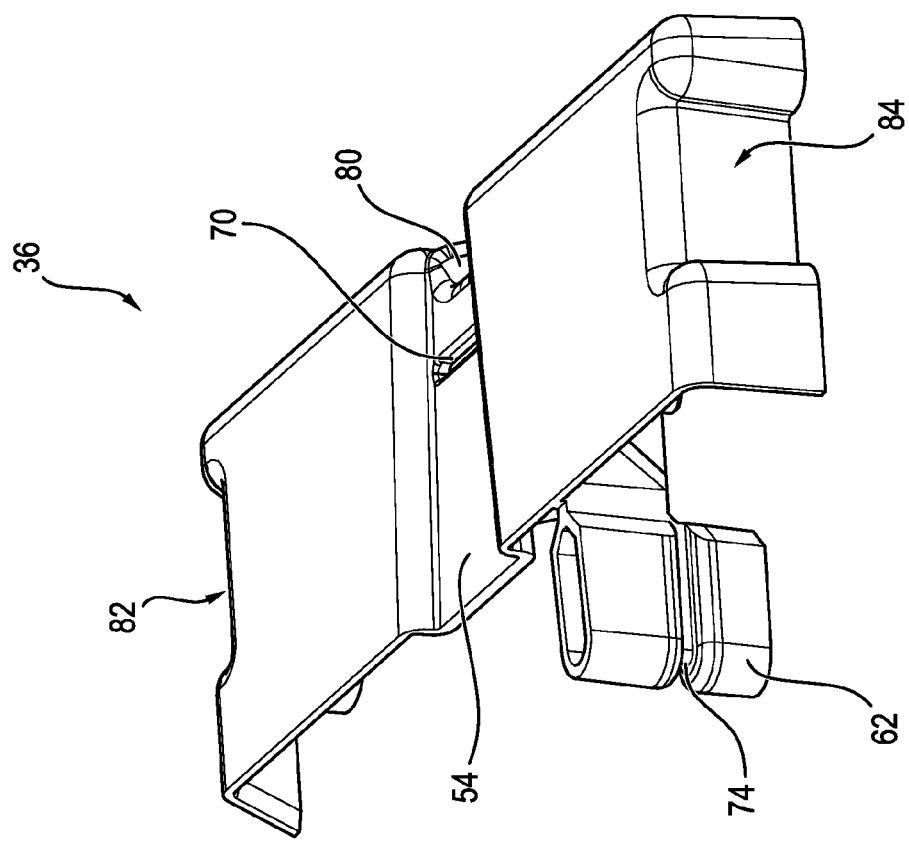
FIG. 10 is a schematic perspective illustration of a cover element of the adapter.

FIG. 10 shows a schematic perspective illustration of the cover element 36 of the adapter 30a. The cover element 36 is provided at each two opposing ends a recess 82, 84 that serves as handle, so that for the person carrying out the maintenance it is much easier to grip the adapter 30a. This results in an easier handling.

Figure 11:
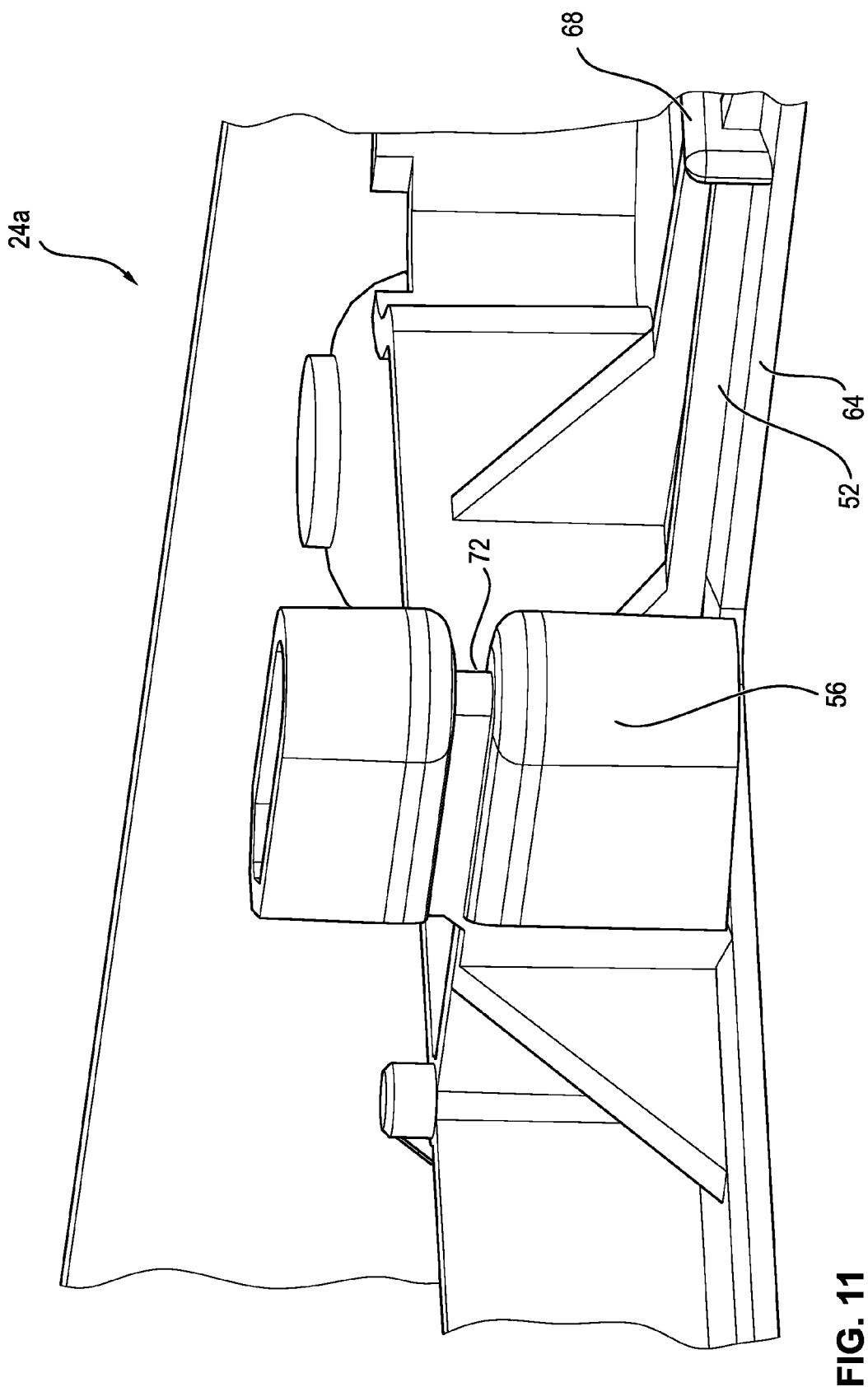
FIG. 11 is a schematic perspective illustration of a guiding element of the cover element of the separating and/or stacking module.

FIG. 11 is a schematic perspective illustration of a portion of the cover element 24a according to FIG. 8. Here, FIG. 11 in particular illustrates the form of the first guiding element 56.

Alternatively, the above-mentioned adapter 30a cannot only be used for automated teller machines 10 but as well as in other maintenance-intensive self-service devices. In particular, the use of the above-mentioned adapter and the respective embodiment of the complementary element on which the adapter is mounted are useful if there is only a limited mounting space for of the adapter and/or the mounting must be carried out without visual contact.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device for handling notes of value, comprising:
a central power supply unit that is electrically conductively connected to a first end of an electrical wire for transmitting electric power to a first module, wherein the second end opposing the first end of the electrical wire is connected to a first plug connector, at least a second module, that is electrically conductively connected to a first end of a second electrical wire for transmitting electrical signals between the first module and the second module, wherein the second end of the second electrical wire opposing the first end is connected to a second plug connector, wherein in an operating state the first module is arranged within the device and is electrically conductively connected to the first electrical wire and to the second electrical wire, and wherein in a maintenance state the first module is moved from its operating position and is neither electrically conductively connected to the first electrical wire nor electrically conductively connected to the second electrical wire, wherein an adapter is provided that includes a third plug connector formed complementary to the first plug connector, a fourth plug connector formed complementary to the second plug connector and at least a fifth plug connector, wherein the fifth plug connector is electrically conductively connected to the third plug connector and electrically conductively connected to the fourth plug connector, wherein the first module includes a sixth plug connector formed complementary to the fifth plug connector, and wherein in the operating state the fifth plug connector is electrically conductive conductively connected to the sixth plug connector so that electrical sower from the first electrical wire and electrical sinals from the second electrical wire are transmitted to the first module.

2. The device according to claim 1, wherein the second module is a module similar to the first module or a central control unit for processing the electrical signals.

3. The device according to claim 1, wherein the second electrical wire is a data line for providing a bus-connection between the first module and the second module.

4. The device according to claim 1, wherein the distance between the third plug connector and the fourth plug connector is in the range of between 40 mm and 70 mm.

5. The device according to claim 1, wherein all electrical signals transmitted to the first module and all electrical signals given by the first module and the entire electric power transmitted to the first module and released by the first module in the operating state can be transmitted via the plug connection between the fifth plug connector and the sixth plug connector.

6. The device according to claim 1, wherein the first module is a separating and/or stacking module for supplying notes of value to a cash box and/or for removing notes of value from the cash box.

7. The device according to claim 6, wherein the cash box is connected to a first end of a third electrical wire for transmitting electric power and/or control signals, that the second end of the third electrical wire opposing the first end is connected to a seventh plug connector, wherein the adapter further includes an eighth plug connector electrically conductive connected to the fifth plug connector and formed complementary to the seventh plug connector, and wherein via the plug connection between the fifth plug connector and the sixth plug connector electric power and/or control signals are transmittable via the third electrical wire.

8. The device according to claim 1, wherein the third plug connector, the fourth plug connector and the fifth plug connector are arranged on a circuit board, and that the third plug connector and the fifth plug connector as well as the fourth plug connector and the fifth plug connector are electrically conductive connected to each other via circuit paths of the circuit board.

9. The device according to claim 8, wherein the length of the circuit path connecting the fourth plug connector to the fifth plug connector is in the range of between 5 mm and 50 mm.

10. The device according to claim 1, wherein the device further includes a third module that is electrically conductive connected to a first end of a fourth electrical wire for transmitting electrical signals between the first module and the third module, wherein a second end of the fourth electrical wire opposing the first end is connected to a ninth plug connector, wherein the adapter further includes a tenth plug connector electrically conductive connected to the fifth plug connector and complementary formed to the ninth plug connector, and wherein via the plug connection between the fifth plug connector and the sixth plug connector transmittable electrical signals can be transmitted via the fourth electrical wire.

11. The device according to claim 10, wherein the first module is a first separating and/or stacking module for supplying notes of value to a first cash box and/or for removing notes of value from the first cash box, the second module is a second separating and/or stacking module for supplying notes of value to a second cash box and/or for removing notes of value from the second cash box and the third module is a third separating and/or stacking module for supplying notes of value to a third cash box and/or for removing notes of value from the third cash box.

12. The device according to claim 1, wherein the first module includes a first cover element, the adapter includes a second cover element, wherein in the operating state the first cover element and the second cover element are connected to each other and that in the maintenance state the first cover element and the second cover element are separated from each other.

13. The device according to claim 12, wherein the first cover element includes an elastic first connecting element, the second cover element comprises a second connecting element formed complementary to the first connecting element, and wherein in the operating state the first cover element and the second cover element are connected to each other via a clip-connection formed between the first connecting element and the second connecting element.

14. The device according to claim 12, wherein the first connecting element is tapered, in particular evenly tapered in the opposite direction of the first cover element.

15. The device according to claim 12, wherein the first cover element includes a first guiding element, wherein the adapter includes a second guiding element formed complementary to the first guiding element, wherein when connecting the first cover element and the second cover element the first guiding element and the second guiding element are at least temporarily engaged with each other and the first cover element and the second cover element are guided relatively to each other via the contact between the first guiding element and the second guiding element and/or that the second cover element includes a third guiding element and that the first module includes a fourth guiding element formed complementary to the third guiding element, wherein when connecting the first cover element and the second cover element the third guiding element and the fourth guiding element are at least temporarily engaged with each other and the first cover element and the second cover element are guided relatively to each other via the contact between the third guiding element and the fourth guiding element.

16. The device according to claim 15, wherein the first guiding element and/or the third guiding element comprise a groove and that the second guiding element is formed as slot in a circuit board of the adapter, in which the first guiding element engages when connecting the first cover element and the second cover element, so that the groove of the first guiding element is guided in the slot and/or the fourth guiding element is formed as slot in a circuit board of the first module, in which the third guiding element engages when connecting the first cover element and the second cover element so that the groove of the third guiding element is guided in the slot.

* * * * *